(12) United States Patent
Kajikawa et al.

(10) Patent No.: US 11,179,813 B2
(45) Date of Patent: Nov. 23, 2021

(54) FLUX AND SOLDER PASTE

(71) Applicant: Senju Metal Industry Co., Ltd., Tokyo (JP)

(72) Inventors: Yasuhiro Kajikawa, Tochigi (JP); Hiroshi Sugii, Tochigi (JP); Hiroyoshi Kawasaki, Tokyo (JP); Yoshinori Hiraoka, San Jose, CA (US)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/961,987

(22) PCT Filed: Jan. 16, 2019

(86) PCT No.: PCT/JP2019/001016
§ 371 (c)(1),
(2) Date: Jul. 14, 2020

(87) PCT Pub. No.: WO2019/142802
PCT Pub. Date: Jul. 25, 2019

(65) Prior Publication Data
US 2021/0069837 A1 Mar. 11, 2021

(30) Foreign Application Priority Data
Jan. 17, 2018 (JP) ............................. JP2018-005917

(51) Int. Cl.
*B23K 35/00* (2006.01)
*B23K 35/362* (2006.01)
*B23K 35/02* (2006.01)

(52) U.S. Cl.
CPC .......... *B23K 35/362* (2013.01); *B23K 35/025* (2013.01)

(58) Field of Classification Search
CPC ....... H01L 2924/00014; H01L 2924/00; H01L 2224/29386; H01L 2224/32225; H01L 2924/00013; H01L 2224/16225; H01L 2224/73204; H01L 2224/2929; H01L 2224/83192; H01L 2924/0665; H01L 2224/29101; H01L 2224/29388; H01L 2224/75301; H01L 2924/014; H01L 2924/15311; H01L 2924/181; H01L 2224/29099; H01L 2224/29199; H01L 2224/29299; H01L 2924/0503; H01L 2924/05032; H01L 2924/05042; H01L 2924/05341; H01L 2924/05432; H01L 2924/05442; H01L 2924/3512; H01L 21/563; H01L 2224/29; H01L 2224/2919; H01L 2224/73203; H01L 2224/743; H01L 2224/75; H01L 2224/81191; H01L 2224/81192; H01L 2224/81193; H01L 2224/81211; H01L 2224/81801; H01L 2224/83191; H01L 2224/83855; H01L 2224/83862; H01L 23/293; H01L 23/49816; H01L 24/13; H01L 24/27; H01L 24/29; H01L 24/743; H01L 24/75; H01L 24/81; H01L 24/83; H01L 2924/01005; H01L 2924/01006; H01L 2924/01011; H01L 2924/01012; H01L 2924/01013; H01L 2924/01019; H01L 2924/0102; H01L 2924/0103; H01L 2924/01033; H01L 2924/01043; H01L 2924/0105; H01L 2924/01056; H01L 2924/01059; H01L 2924/01075; H01L 2924/01082; H01L 2924/3511; B23K 35/3612; B23K 35/362; B23K 35/3613; B23K 35/3615; B23K 35/3618; B23K 35/025; B23K 35/262; B23K 2101/42; B23K 35/0244; B23K 35/224; B23K 35/26

See application file for complete search history.

(56) References Cited

U.S. PATENT DOCUMENTS

| 4,561,913 A * | 12/1985 | Zado ................. B23K 35/3618 106/240 |
| 7,861,915 B2 | 1/2011 | Kay et al. |
| 2006/0011267 A1 | 1/2006 | Kay et al. |
| 2007/0221710 A1 | 9/2007 | Akamatsu et al. |
| 2011/0068483 A1* | 3/2011 | Katsurayama .......... H01L 24/27 257/778 |
| 2014/0370311 A1 | 12/2014 | Boulord et al. |

(Continued)

FOREIGN PATENT DOCUMENTS

| CN | 1950172 A | 4/2007 |
| CN | 1972779 A | 5/2007 |

(Continued)

*Primary Examiner* — Erin B Saad
(74) *Attorney, Agent, or Firm* — The Webb Law Firm

(57) ABSTRACT

Provided is a flux that includes a heat-resistant activator having low reactivity with thermosetting resins, and a solder paste in which the flux is used. The flux includes 5 wt % or more and 20 wt % or less of any one of a dimer acid, a trimer acid, a hydrogenated dimer acid obtained by hydrogenating the dimer acid, and a hydrogenated trimer acid obtained by hydrogenating the trimer acid, on in total, of two or more of a dimer acid, a trimer acid, a hydrogenated dimer acid obtained by hydrogenating the dimer acid, and a hydrogenated trimer acid obtained by hydrogenating the trimer acid; 30 wt % or more and 70 wt % or less of a thermosetting resin; and 3 wt % or more and 15 wt % or less of an amine. The solder paste includes solder powder and the flux.

16 Claims, No Drawings

(56) References Cited

U.S. PATENT DOCUMENTS

2015/0090367 A1* 4/2015 Tsuchiya ............ B23K 35/3612
148/24
2015/0102090 A1 4/2015 Arai et al.

FOREIGN PATENT DOCUMENTS

| | | | |
|---|---|---|---|
| CN | 105855749 | A | 8/2016 |
| CN | 107570911 | A | 1/2018 |
| JP | 2007532321 | A | 11/2007 |
| JP | 2008300443 | A | 12/2008 |
| JP | 4757070 | B2 | 8/2011 |
| JP | 2013188761 | A | 9/2013 |
| JP | 2015511888 | A | 4/2015 |
| JP | 2016181599 | A | 10/2016 |
| JP | 2018008287 | A | 1/2018 |
| WO | 2005110657 | A2 | 11/2005 |
| WO | 2018003820 | A1 | 1/2018 |

* cited by examiner

FLUX AND SOLDER PASTE

CROSS-REFERENCE TO RELATED APPLICATIONS

This application is the United States national phase of International Application No. PCT/JP2019/001016 filed Jan. 16, 2019, and claims priority to Japanese Patent Application No. 2018-005917 filed Jan. 17, 2018, the disclosures of which are hereby incorporated by reference in their entirety.

TECHNICAL FIELD

The present invention relates to a flux for use in soldering and a solder paste using the flux.

BACKGROUND

In general, a flux used in soldering has effects of chemically removing metal oxides present on solder and the metal surface of a joint target to be soldered and allowing movement of metal elements at the boundary between the two. Therefore, by soldering using the flux, an intermetallic compound can be formed between the solder and the metal surface of the joint target, so that strong joint can be obtained.

With recent progress of miniaturization of an electronic component, an electrode that is a soldered site of the electronic component has also become smaller. Therefore, the area that can be joined with a solder alloy is reduced, and the joining strength with the solder alloy alone may be insufficient for joining reliability.

Therefore, as a component fixing means for strengthening joining by soldering, a technique for fixing an electronic component or the like by covering the periphery of a soldering joint target location with a resin such as underfill has been proposed.

The flux components include a component that does not decompose or volatilize upon heating of soldering, which remains as a flux residue around the soldered portion after soldering.

Conventionally, if a flux residue remains at a soldering joint target location, the flux residue inhibits fixation between the joint target location and the resin, so that the strength cannot be ensured. For this reason, in order to cover the periphery of the joint target location with the resin, it is necessary to wash out the flux residue. However, it takes time and cost to wash out the flux residue.

Therefore, a technique has been proposed in which the thermosetting resin in the flux can be maintained in an uncured state even after reflowing, so that the resin in the flux residue and the underfill can be compatible with each other (for example, see Japanese Patent No. 4757070).
Patent Document 1: Japanese Patent No. 4757070

SUMMARY

Some activators such as organic acids and amines react with thermosetting resins. In a flux containing the thermosetting resin, when the activator and the thermosetting resin react with each other, the thermosetting resin may be cured before the solder gets wet. If the thermosetting resin is cured before the solder gets wet, the solder and the metal such as an electrode cannot be brought into contact with each other, thereby causing a state called not-wetting in which an alloy layer cannot be formed.

In addition, when the activator volatilizes upon heating of soldering, the gas is taken into the thermosetting resin and becomes a cause of voids in the residue.

The present invention has been made to solve such problems, and an object thereof is to provide a flux containing an activator that has low reactivity with a thermosetting resin and heat resistance, and a solder paste using the flux.

A dimer acid which is a reaction product of oleic acid and linoleic acid and its hydrogenated product, and a trimer acid which is a reaction product of oleic acid and linoleic acid and its hydrogenated product have been found to have low reactivity with a thermosetting resin and heat resistance, so that solder gets wet well.

Therefore, the present invention is a flux including: 5 wt % or more and 20 wt % or less of any one of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, or, in total, of two or more of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid; 30 wt % or more and 70 wt % or less of a thermosetting resin; and 3 wt % or more and 15 wt % or less of an amine.

The present invention is also a flux including: 5 wt % or more and 20 wt % or less of any one of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid, or, in total, of two or more of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid; 30 wt % or more and 70 wt % or less of a thermosetting resin; and 3 wt % or more and 15 wt % or less of an amine.

In the flux of the present invention, the thermosetting resin is preferably an epoxy resin. The flux further preferably includes 0 wt % or more and 10 wt % or less of an organic acid having 12 or less carbon atoms, 0 wt % or more and 40 wt % or less of a phenolic curing agent, 0 wt % or more and 15 wt % or less of a solvent, and 0 wt % or more and 10 wt % or less of a thixotropic agent, and further preferably includes a silane coupling agent.

Moreover, the present invention is a solder paste including the flux described above and metal powder.

A dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, as well as a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid have low reactivity with a thermosetting resin.

Thus, in the present invention, the curing of the thermosetting resin is suppressed before a solder gets wet, so that the solder gets wet well.

In addition, a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, as well as a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid have heat resistance.

As a result, volatilization due to heating during soldering is suppressed, and the gas that can be taken into the thermosetting resin is reduced, so that the cause of generating voids in the residue can be reduced.

DETAILED DESCRIPTION

<Example of Flux According to Present Embodiment>

The flux of the present embodiment contains any one of a dimer acid obtained by dimerizing a monocarboxylic acid, a trimer acid obtained by trimerizing a monocarboxylic acid, a hydrogenated dimer acid obtained by adding hydrogen to (hydrogenating) the dimer acid, and a hydrogenated trimer acid obtained by adding hydrogen to (hydrogenating) the trimer acid, or two or more of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid; a thermosetting resin; and an amine.

In addition, the flux of the present embodiment contains: any one of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid; a thermosetting resin; and an amine.

The dimer acid of the present embodiment is a reaction product of oleic acid and linoleic acid, and is a dimer having 36 carbon atoms. The trimer acid of the present embodiment is a reaction product of oleic acid and linoleic acid, and is a trimer having 54 carbon atoms.

Further, examples of a dimer acid other than a reaction product of oleic acid and linoleic acid, a trimer acid other than a reaction product of oleic acid and linoleic acid, a hydrogenated dimer acid obtained by adding hydrogen to (hydrogenating) the dimer acid other than a reaction product of oleic acid and linoleic acid, or a hydrogenated trimer acid obtained by adding hydrogen to (hydrogenating) the trimer acid other than a reaction product of oleic acid and linoleic acid include a dimer acid which is a reaction product of acrylic acid, a trimer acid which is a reaction product of acrylic acid, a dimer acid which is a reaction product of methacrylic acid, a trimer acid which is a reaction product of methacrylic acid, a dimer acid which is a reaction product of acrylic acid and methacrylic acid, a trimer acid which is a reaction product of acrylic acid and methacrylic acid, a dimer acid which is a reaction product of oleic acid, a trimer acid which is a reaction product of oleic acid, a dimer acid which is a reaction product of linoleic acid, a trimer acid which is a reaction product of linoleic acid, a dimer acid which is a reaction product of linolenic acid, a trimer acid which is a reaction product of linolenic acid, a dimer acid which is a reaction product of acrylic acid and oleic acid, a trimer acid which is a reaction product of acrylic acid and oleic acid, a dimer acid which is a reaction product of acrylic acid and linoleic acid, a trimer acid which is a reaction product of acrylic acid and linoleic acid, a dimer acid which is a reaction product of acrylic acid and linolenic acid, a trimer acid which is a reaction product of acrylic acid and linolenic acid, a dimer acid which is a reaction product of methacrylic acid and oleic acid, a trimer acid which is a reaction product of methacrylic acid and oleic acid, a dimer acid which is a reaction product of methacrylic acid and linoleic acid, a trimer acid which is a reaction product of methacrylic acid and linoleic acid, a dimer acid which is a reaction product of methacrylic acid and linolenic acid, a trimer acid which is a reaction product of methacrylic acid and linolenic acid, a dimer acid which is a reaction product of oleic acid and linolenic acid, a trimer acid which is a reaction product of oleic acid and linolenic acid, a dimer acid which is a reaction product of linoleic acid and linolenic acid, a trimer acid which is a reaction product of linoleic acid and linolenic acid, a hydrogenated dimer acid obtained by adding hydrogen to (hydrogenating) a dimer acid other than the reaction product of oleic acid and linoleic acid indicated above, and a hydrogenated trimer acid obtained by adding hydrogen to (hydrogenating) a trimer acid other than the reaction product of oleic acid and linoleic acid indicated above.

A dimer acid which is a reaction product of oleic acid and linoleic acid, a dimer acid other than the reaction product of oleic acid and linoleic acid, a trimer acid which is a reaction product of oleic acid and linoleic acid, a trimer acid other than the reaction product of oleic acid and linoleic acid, a hydrogenated dimer acid obtained by adding hydrogen to (hydrogenating) the dimer acid which is a reaction product of oleic acid and linoleic acid, a hydrogenated dimer acid obtained by adding hydrogen to (hydrogenating) a dimer acid other than the reaction product of oleic acid and linoleic acid, a hydrogenated trimer acid obtained by adding hydrogen to (hydrogenating) the trimer acid which is a reaction product of oleic acid and linoleic acid, and a hydrogenated trimer acid obtained by adding hydrogen to (hydrogenating) a trimer acid other than the reaction product of oleic acid and linoleic acid have an activity for chemically removing metal oxides. Moreover, they have low reactivity with a thermosetting resin and heat resistance in the temperature range assumed by soldering, and volatilization in the temperature range assumed by soldering is suppressed.

When the amount of each of a dimer acid which is a reaction product of oleic acid and linoleic acid, a dimer acid other than the reaction product of oleic acid and linoleic acid, a trimer acid which is a reaction product of oleic acid and linoleic acid, a trimer acid other than the reaction product of oleic acid and linoleic acid, a hydrogenated dimer acid obtained by adding hydrogen to (hydrogenating) the dimer acid which is a reaction product of oleic acid and linoleic acid, a hydrogenated dimer acid obtained by adding hydrogen to (hydrogenating) a dimer acid other than the reaction product of oleic acid and linoleic acid, a hydrogenated trimer acid obtained by adding hydrogen to (hydrogenating) the trimer acid which is a reaction product of oleic acid and linoleic acid, and a hydrogenated trimer acid obtained by adding hydrogen to (hydrogenating) a trimer acid other than the reaction product of oleic acid and linoleic acid to be added is small, the activity for chemically removing metal oxides becomes insufficient.

For this reason, it is conceivable to add different activators. However, some activators react with thermosetting resins. In a flux containing the thermosetting resin, when the activator and the thermosetting resin react with each other, the thermosetting resin may be cured before the solder gets wet. Further, when the activator and the thermosetting resin react with each other, the activity for chemically removing metal oxides becomes insufficient, leading to deterioration in solder wettability.

Further, when the boiling point of the activator is close to the melting point of the solder, the activator volatilizes upon heating of soldering. When the activator volatilizes, the gas is taken into the thermosetting resin and causes voids in the residue.

Therefore, the flux of the present embodiment contains 5 wt % or more and 20 wt % or less of any one of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, or, in total, of two or more of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid.

In addition, the flux of the present embodiment contains 5 wt % or more and 20 wt % or less of any one of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid, or, in total, two or more of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid.

The flux of the present embodiment contains 30 wt % or more and 70 wt % or less of a thermosetting resin and 3 wt % or more and 15 wt % or less of an amine.

In addition, the flux of the present embodiment contains 0 wt % or more and 10 wt % or less of an organic acid having 12 or less carbon atoms, 0 wt % or more and 40 wt % or less of a phenolic curing agent, 0 wt % or more and 15 wt % or less of a solvent, and 0 wt % or more and 10 wt % or less of a thixotropic agent. The flux of the present embodiment may further contain a silane coupling agent.

The thermosetting resin include generally known epoxy resins, and examples of such epoxy resins include bisphenol type epoxy resins such as bisphenol A type, bisphenol AP type, bisphenol AF type, bisphenol B type, bisphenol BP type, bisphenol C type, bisphenol E type, bisphenol F type, bisphenol G type, bisphenol M type, bisphenol S type, bisphenol P type, bisphenol PH type, bisphenol TMC type, and bisphenol Z type, biphenyl type epoxy resins, diphenyl ether type epoxy resins, naphthalene type epoxy resins, aminophenol type epoxy resins, and 3',4'-epoxycyclohexanecarboxylic acid 3,4-epoxycyclohexylmethyl.

Examples of the amine include monoethanolamine, diphenylguanidine, ditolylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-di amino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo [1,2-a] benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl) aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis [(1H-benzotriazol-1-yl)methyl]-4-methylphenol, 5-methyl benzotriazole, and 5-phenyltetrazole.

Examples of the organic acid having 12 or less carbon atoms include a glutaric acid, an adipic acid, an azelaic acid, a citric acid, a glycolic acid, a succinic acid, a salicylic acid, a diglycolic acid, a dipicolinic acid, a suberic acid, a sebacic acid, a thioglycol acid, a phthalic acid, an isophthalic acid, a terephthalic acid, a dodecanedioic acid, a parahydroxyphenylacetic acid, a picolinic acid, a phenylsuccinic acid, a fumaric acid, a maleic acid, a malonic acid, a lauric acid, a benzoic acid, a tartaric acid, a tris(2-carboxyethyl)isocyanurate, a glycine, a 1,3-cyclohexanedicarboxylic acid, a 2,2-bis(hydroxymethyl)propionic acid, a 2,2-bis(hydroxymethyl)butanoic acid, a 4-tert-butylbenzoic acid, a 2,3-dihydroxybenzoic acid, a 2,4-diethyl glutaric acid, a 2-quinolinecarboxylic acid, a 3-hydroxybenzoic acid, a malic acid, and a p-anisic acid.

Examples of the phenolic curing agent include diallyl bisphenol A, phenol novolac, and phenol resins.

Examples of the solvent include alcohol solvents, glycol ether solvents, and terpineols. Examples of alcohol solvent include ethanol, industrial ethanol (mixed solvent obtained by adding methanol and/or isopropyl alcohol to ethanol), isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis [2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octin-3,6-diol, and 2,4,7,9-tetramethyl-5-decyne-4,7-diol. Examples of the glycol ether solvents include hexyl diglycol, diethylene glycol mono-2-ethyl hexyl ether, ethylene glycol monophenyl ether, 2-methylpentane-2,4-diol, diethylene glycol dibutyl ether, triethylene glycol monobutyl ether, and diethyl diglycol ether.

Examples of the thixotropic agent include wax-based thixotropic agents and amide-based thixotropic agents. Examples of the wax-based thixotropic agents include hydrogenated castor oil. Examples of the amide-based thixotropic agents include lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenemethaneamide, aromatic amide, methylene bisstearic acid amide, ethylene bislauric acid amide, ethylene bishydroxystearic acid amide, saturated fatty acid bisamides, methylene bisoleic acid amide, unsaturated fatty acid bisamides, m-xylylene bisstearic acid amides, aromatic bisamides, saturated fatty acid polyamide, unsaturated fatty acid polyamide, aromatic polyamide, substituted amide, methylol stearic acid amide, methylol amide, and fatty acid ester amide. Examples of the silane coupling agent include: vinyltrimethoxysilane, vinyltriethoxysilane, 2-(3,4-epoxycyclohexyl) ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxy silane, 3-aminopropyltrimethoxysilane, 3-aminopropyltriethoxysilane, 3-triethoxy silyl-N-(1,3-dimethyl-butylidene) propylamine, N-phenyl-2-aminopropyltrimethoxysilane, tris-(trimethoxysilylpropyl) isocyanurate, 3-ureidopropyltriethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane.

<Example of Solder Paste of Present Embodiment>

A solder paste of the present embodiment includes the above-described flux and metal powder. The metal powder is preferably Pb-free solder, and contains solder powder containing: Sn metal; Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P, or the like to any of these alloys.

<Action/Effect Example of Flux and Solder Paste of Present Embodiment>

The flux containing 5 wt % or more and 20 wt % or less of any one of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, or, in total, of two or more of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, and the solder paste using this flux can provide solder wettability. Further, it is possible to suppress volatilization in the temperature range assumed for soldering and generation of voids in the thermosetting resin.

The flux containing 5 wt % or more and 20 wt % or less of any one of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid, or, in total, of two or more of a dimer acid which is a reaction product of oleic acid and linoleic acid, a trimer acid which is a reaction product of oleic acid and linoleic acid, a hydrogenated dimer acid obtained by adding hydrogen to (hydrogenating) the dimer acid which is a reaction product of oleic acid and linoleic acid, and a hydrogenated trimer acid obtained by adding hydrogen to (hydrogenating) the trimer acid which is a reaction product of oleic acid and linoleic acid, and the solder paste using this flux can provide solder wettability. Further, it is possible to suppress volatilization in the temperature range assumed for soldering and generation of voids in the thermosetting resin.

EXECUTED EXAMPLES

Fluxes of the Executed Examples and the Comparison Examples were prepared with the compositions shown in Tables 1 and 2 below to verify the solder wettability and the voids in epoxy resins. The composition rates in Tables 1 and 2 are expressed in wt (weight) % when the total amount of each flux is 100.

<Evaluation of Solder Wettability>
(1) Verification Method

For evaluation of solder wettability, a sample was prepared by printing the flux of each of the Executed Examples and the Comparison Examples with a thickness of 0.1 mm on a Cu-OSP electrode and placing a solder ball of φ0.3 mm thereon. The solder has a composition expressed as Sn-3Ag-0.5Cu, which contains 3.0 wt % of Ag and 0.5 wt % of Cu, and the balance of Sn. Each sample was heated from 25° C. to 250° C. in a $N_2$ atmosphere at a temperature rising rate of 1° C./sec, using a reflow furnace. Then, the solder wetting was visually checked.

(2) Criterion for Determination
  ○: Solder was wet.
  x: Solder was not wet.

<Evaluation of Epoxy Void>
(1) Verification Method

For evaluation of voids in epoxy resins, the flux of each of the Examples and the Comparative Examples was applied onto a glass plate, and a BGA (ball grid array) was placed thereon to prepare a sample. BGA has a size of 10 mm on one side, and a solder bump has a composition expressed as Sn-3Ag-0.5Cu, which contains 3.0 wt % of Ag and 0.5 wt % of Cu, and the balance of Sn. The diameter of the solder bump is φ0.3 mm, the pitch of the solder bumps is 0.5 mm, and the number of the solder bumps is 192. Each sample was heated from 25° C. to 250° C. in a $N_2$ atmosphere at a temperature rising rate of 1° C./sec using a reflow furnace. Then, the generation of voids was observed from the back side of the glass plate.

(2) Criterion for Determination
 ∘∘: Void generation rate was 20% or less.
 ∘: Void generation rate was more than 20% and 50% or less.
 x: Void generation rate was more than 50%.

<Comprehensive Evaluation>
 ∘: Wettability evaluation was ∘, and evaluation of voids in epoxy resins was ∘∘ or ∘.

TABLE 1

| Material | | Executed Example 1 | Executed Example 2 | Executed Example 3 | Executed Example 4 | Executed Example 5 | Executed Example 6 | Executed Example 7 | Executed Example 8 | Executed Example 9 | Executed Example 10 |
|---|---|---|---|---|---|---|---|---|---|---|---|
| Dimer acid | Dimer acid | 10 | 10 | 10 | 10 | 10 | 5 | 15 | 20 | | |
| | Trimer acid | | | | | | | | | 10 | 10 |
| | Hydrogenated dimer acid | | | | | | | | | | |
| | Hydrogenated trimer acid | | | | | | | | | | |
| | Mixed acid | | | | | | | | | | |
| Organic acid | Glutaric acid | 5 | | | | | 8 | | 6 | 5 | |
| | Succinic acid | | 5 | | | | | | | | 5 |
| | Adipic acid | | | 5 | | | | | | | |
| | Azelaic acid | | | | 5 | | | | | | |
| Epoxy resin | Epoxy resin | 43 | 43 | 43 | 43 | 43 | 43 | 43 | 43 | 62 | 43 |
| Phenolic curing agent | Diethyl Bisphenol A | 25 | 25 | 25 | 25 | 30 | 27 | 25 | 0 | 25 | 25 |
| Amine | Diphenyl-guanidine | 5 | 5 | 5 | 5 | 5 | 5 | 5 | 10 | 5 | 5 |
| Thixotropic agent | Bisamide thixotropic agent | 1 | 1 | 1 | 1 | 1 | 1 | 1 | 1 | 1 | 1 |
| | Hydrogenated castor oil | 1 | 1 | 1 | 1 | 1 | 1 | 1 | 1 | 1 | 1 |
| Solvent | Dibutyl diglycol ether | 10 | 10 | 10 | 10 | 10 | 10 | 10 | | 10 | 10 |
| Wettability | | ∘ | ∘ | ∘ | ∘ | ∘ | ∘ | ∘ | ∘ | ∘ | ∘ |
| Epoxy void | | ∘∘ | ∘∘ | ∘∘ | ∘∘ | ∘∘ | ∘∘ | ∘∘ | ∘∘ | ∘∘ | ∘∘ |

| Material | | Executed Example 11 | Executed Example 12 | Executed Example 13 | Executed Example 14 | Executed Example 15 | Executed Example 16 | Executed Example 17 | Executed Example 18 | Executed Example 9 | Executed Example 20 |
|---|---|---|---|---|---|---|---|---|---|---|---|
| Dimer acid | Dimer acid | | | | | | | | | | |
| | Trimer acid | 10 | 10 | 10 | 5 | 15 | 20 | | | | |
| | Hydrogenated dimer acid | | | | | | | 10 | 10 | 10 | 10 |
| | Hydrogenated trimer acid | | | | | | | | | | |
| | Mixed acid | | | | | | | | | | |
| Organic acid | Glutaric acid | | | | 8 | | 6 | 5 | | | |
| | Succinic acid | | | | | | | | 5 | | |
| | Adipic acid | 5 | | | | | | | | 5 | |
| | Azelaic acid | | 5 | | | | | | | | 5 |
| Epoxy resin | Epoxy resin | 43 | 43 | 43 | 43 | 43 | 62 | 43 | 43 | 43 | 43 |
| Phenolic curing agent | Diethyl Bisphenol A | 25 | 25 | 30 | 27 | 25 | 0 | 25 | 25 | 25 | 25 |
| Amine | Diphenyl-guanidine | 5 | 5 | 5 | 5 | 5 | 10 | 5 | 5 | 5 | 5 |
| Thixotropic agent | Bisamide thixotropic agent | 1 | 1 | 1 | 1 | 1 | 1 | 1 | 1 | 1 | 1 |
| | Hydrogenated castor oil | 1 | 1 | 1 | 1 | 1 | 1 | 1 | 1 | 1 | 1 |
| Solvent | Dibutyl diglycol ether | 10 | 10 | 10 | 10 | 10 | | 10 | 10 | 10 | 10 |
| Wettability | | ∘ | ∘ | ∘ | ∘ | ∘ | ∘ | ∘ | ∘ | ∘ | ∘ |
| Epoxy void | | ∘∘ | ∘∘ | ∘∘ | ∘∘ | ∘∘ | ∘∘ | ∘∘ | ∘∘ | ∘∘ | ∘∘ |

TABLE 2

| Material | | Executed Example 21 | Executed Example 22 | Executed Example 23 | Executed Example 24 | Executed Example 25 | Executed Example 26 | Executed Example 27 | Executed Example 28 | Executed Example 29 | Executed Example 30 |
|---|---|---|---|---|---|---|---|---|---|---|---|
| Dimer acid | Dimer acid | | | | | | | | | | |
| | Trimer acid | | | | | | | | | | |
| | Hydrogenated dimer acid | 10 | 5 | 15 | 20 | | | | | | |
| | Hydrogenated trimer acid | | | | | 10 | 10 | 10 | 10 | 10 | 5 |
| | Mixed acid | | | | | | | | | | |
| Organic acid | Glutaric acid | | 8 | | 6 | 5 | | | | | 8 |
| | Succinic acid | | | | | | 5 | | | | |
| | Adipic acid | | | | | | | 5 | | | |
| | Azelaic acid | | | | | | | | 5 | | |
| Epoxy resin | Epoxy resin | 43 | 43 | 43 | 62 | 43 | 43 | 43 | 43 | 43 | 43 |
| Phenolic curing agent | Diethyl Bisphenol A | 30 | 27 | 25 | 0 | 25 | 25 | 25 | 25 | 30 | 27 |
| Amine | Diphenylguanidine | 5 | 5 | 5 | 10 | 5 | 5 | 5 | 5 | 5 | 5 |
| Thixotropic agent | Bisamide thixotropic agent | 1 | 1 | 1 | 1 | 1 | 1 | 1 | 1 | 1 | 1 |
| | Hydrogenated castor oil | 1 | 1 | 1 | 1 | 1 | 1 | 1 | 1 | 1 | 1 |
| Solvent | Dibutyl diglycol ether | 10 | 10 | 10 | | 10 | 10 | 10 | 10 | 10 | 10 |
| | Wettability | ○ | ○ | ○ | ○ | ○ | ○ | ○ | ○ | ○ | ○ |
| | Epoxy void | ○○ | ○○ | ○○ | ○○ | ○○ | ○○ | ○○ | ○○ | ○○ | ○○ |

| Material | | Executed Example 31 | Executed Example 32 | Executed Example 33 | Executed Example 34 | Executed Example 35 | Executed Example 36 | Executed Example 37 | Comparative Example 1 | Comparative Example 2 | Comparative Example 3 |
|---|---|---|---|---|---|---|---|---|---|---|---|
| Dimer acid | Dimer acid | | | 2.5 | 10 | 10 | 10 | 10 | | | |
| | Trimer acid | | | 2.5 | | | | | | | |
| | Hydrogenated dimer acid | | | 2.5 | | | | | | | |
| | Hydrogenated trimer acid | 15 | 20 | 2.5 | | | | | | | |
| | Mixed acid | | | | | | | | 10 | | 20 |
| Organic acid | Glutaric acid | | 6 | 5 | 5 | 5 | 5 | 5 | 5 | 15 | 6 |
| | Succinic acid | | | | | | | | | | |
| | Adipic acid | | | | | | | | | | |
| | Azelaic acid | | | | | | | | | | |
| Epoxy resin | Epoxy resin | 43 | 62 | 43 | 43 | 43 | 43 | 43 | 43 | 43 | 62 |
| Phenolic curing agent | Diethyl Bisphenol A | 25 | 0 | 25 | 25 | 25 | 20 | 17 | 25 | 25 | 0 |
| Amine | Diphenylguanidine | 5 | 10 | 5 | 5 | 5 | 5 | 5 | 5 | 5 | 10 |
| Thixotropic agent | Bisamide thixotropic agent | 1 | 1 | 1 | 2 | | | 5 | 2 | 2 | 2 |
| | Hydrogenated castor oil | 1 | 1 | 1 | | 2 | 7 | 5 | | | |
| Solvent | Dibutyl diglycol ether | 10 | | 10 | 10 | 10 | 10 | 10 | 10 | 10 | |
| | Wettability | ○ | ○ | ○ | ○ | ○ | ○ | ○ | x | ○ | x |
| | Epoxy void | ○○ | ○○ | ○○ | ○○ | ○○ | ○○ | ○○ | ○ | x | ○ |

Executed Example 1 containing a dimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; diallyl bisphenol A as a phenolic curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, provided a sufficient effect on the solder wettability. Also, the effect of suppressing generation of voids in the epoxy resin was obtained.

Executed Example 2 containing a dimer acid, which was a reaction product of oleic acid and linoleic acid, in an amount of 10 wt % within the range defined in the present invention; succinic acid with 4 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 3 containing a dimer acid, which was a reaction product of oleic acid and linoleic acid, in an amount of 10 wt % within the range defined in the present invention; adipic acid with 6 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 4 containing a dimer acid, which was a reaction product of oleic acid and linoleic acid, in an amount of 10 wt % within the range defined in the present invention; azelaic acid with 9 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 5 containing a dimer acid, which was a reaction product of oleic acid and linoleic acid, in an amount of 10 wt % within the range defined in the present invention; no different organic acid; an epoxy resin as a thermosetting resin in an amount of 43 wt % within the range defined in the present invention; a phenolic curing agent as a curing agent in an amount of 30 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 6 containing a dimer acid, which was a reaction product of oleic acid and linoleic acid, in an amount of 5 wt %, which was decreased within the range defined in the present invention; glutaric acid with 5 carbon atoms as a different organic acid, in an amount of 8 wt %, which was increased within the range defined in the present invention; an epoxy resin as a thermosetting resin in an amount of 43 wt % within the range defined in the present invention; a phenolic curing agent as a curing agent in an amount of 27 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 7 containing a dimer acid, which was a reaction product of oleic acid and linoleic acid, in an amount of 15 wt %, which was increased within the range defined in the present invention; no different organic acid; an epoxy resin as a thermosetting resin in an amount of 43 wt % within the range defined in the present invention; a phenolic curing agent as a curing agent in an amount of 30 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 8 containing a dimer acid, which was a reaction product of oleic acid and linoleic acid, in an amount of 20 wt %, which was increased within the range defined in the present invention; glutaric acid with 5 carbon atoms as a different organic acid in an amount of 6 wt %, which was increased within the range defined in the present invention; an epoxy resin as a thermosetting resin in an amount of 62 wt %, which was increased within the range defined in the present invention; no curing agent; diphenylguanidine as an amine in an amount of 10 wt %, which was increased within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and no solvent, also provided a sufficient effect on the solder wettability. Also, the effect of suppressing generation of voids in the epoxy resin was obtained.

Executed Example 9 containing a trimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 10 containing a trimer acid, which was a reaction product of oleic acid and linoleic acid, in an amount of 10 wt % within the range defined in the present invention; succinic acid with 4 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 11 containing a trimer acid, which was a reaction product of oleic acid and linoleic acid, in an amount of 10 wt % within the range defined in the present invention; adipic acid with 6 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 12 containing a trimer acid, which was a reaction product of oleic acid and linoleic acid, in an amount of 10 wt % within the range defined in the present invention; azelaic acid with 9 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 13 containing a trimer acid, which was a reaction product of oleic acid and linoleic acid, in an amount of 10 wt % within the range defined in the present invention; no different organic acid; an epoxy resin as a thermosetting resin in an amount of 43 wt % within the range defined in the present invention; a phenolic curing agent as a curing agent in an amount of 30 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 14 containing a trimer acid, which was a reaction product of oleic acid and linoleic acid, in an amount of 5 wt %, which was decreased within the range defined in the present invention; glutaric acid with 5 carbon atoms as a different organic acid, in an amount of 8 wt %, which was increased within the range defined in the present invention; an epoxy resin as a thermosetting resin in an amount of 43 wt % within the range defined in the present invention; a phenolic curing agent as a curing agent in an amount of 27 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 15 containing a trimer acid, which was a reaction product of oleic acid and linoleic acid, in an amount of 15 wt %, which was increased within the range defined in the present invention; no different organic acid; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 16 containing a trimer acid, which was a reaction product of oleic acid and linoleic acid, in an amount of 20 wt %, which was increased within the range defined in the present invention; glutaric acid with 5 carbon atoms as a different organic acid in an amount of 6 wt %, which was increased within the range defined in the present invention; an epoxy resin as a thermosetting resin in an amount of 62 wt %, which was increased within the range defined in the present invention; no curing agent; diphenylguanidine as an amine in an amount of 10 wt %, which was increased within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and no solvent, also provided a sufficient effect on the solder wettability. Also, the effect of suppressing generation of voids in the epoxy resin was obtained.

Executed Example 17 containing a hydrogenated dimer acid obtained by adding hydrogen to (hydrogenating) a dimer acid which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 18 containing a hydrogenated dimer acid obtained by adding hydrogen to (hydrogenating) a dimer acid which was a reaction product of oleic acid and linoleic acid, in an amount of 10 wt % within the range defined in the present invention; succinic acid with 4 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 19 containing a hydrogenated dimer acid obtained by adding hydrogen to (hydrogenating) a dimer acid which was a reaction product of oleic acid and linoleic acid, in an amount of 10 wt % within the range defined in the present invention; adipic acid with 6 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 20 containing a hydrogenated dimer acid obtained by adding hydrogen to (hydrogenating) a dimer acid which was a reaction product of oleic acid and linoleic acid, in an amount of 10 wt % within the range defined in the present invention; azelaic acid with 9 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 21 containing a hydrogenated dimer acid obtained by adding hydrogen to (hydrogenating) a dimer acid which was a reaction product of oleic acid and linoleic acid, in an amount of 10 wt % within the range defined in the present invention; no different organic acid; an epoxy resin as a thermosetting resin in an amount of 43 wt % within the range defined in the present invention; a phenolic curing agent as a curing agent in an amount of 30 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 22 containing a hydrogenated dimer acid obtained by adding hydrogen to (hydrogenating) a dimer acid which was a reaction product of oleic acid and linoleic acid, in an amount of 5 wt %, which was decreased within the range defined in the present invention; glutaric acid with 5 carbon atoms as a different organic acid in an amount of 8 wt %, which was increased within the range defined in the present invention; an epoxy resin as a thermosetting resin in an amount of 43 wt % within the range defined in the present invention; a phenolic curing agent as a curing agent in an amount of 27 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 23 containing a hydrogenated dimer acid obtained by adding hydrogen to (hydrogenating) a dimer acid which was a reaction product of oleic acid and linoleic acid, in an amount of 15 wt %, which was increased within the range defined in the present invention; no different organic acid; an epoxy resin as a thermosetting resin in an amount of 43 wt % within the range defined in the present invention; a phenolic curing agent as a curing agent in an amount of 25% within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 24 containing a hydrogenated dimer acid obtained by adding hydrogen to (hydrogenating) a dimer acid which was a reaction product of oleic acid and linoleic acid, in an amount of 20 wt %, which was increased within the range defined in the present invention; glutaric acid with 5 carbon atoms as a different organic acid in an amount of 6 wt %, which was increased within the range defined in the present invention; an epoxy resin as a thermosetting resin in an amount of 62 wt %, which was increased within the range defined in the present invention; no curing agent; diphenylguanidine as an amine in an amount of 10 wt %, which was increased within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and no solvent, also provided a sufficient effect on the solder wettability. Also, the effect of suppressing generation of voids in the epoxy resin was obtained.

Executed Example 25 containing a hydrogenated trimer acid obtained by adding hydrogen to (hydrogenating) a trimer acid which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 26 containing a hydrogenated trimer acid obtained by adding hydrogen to (hydrogenating) a trimer acid which was a reaction product of oleic acid and linoleic acid, in an amount of 10 wt % within the range defined in the present invention; succinic acid with 4 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 27 containing a hydrogenated trimer acid obtained by adding hydrogen to (hydrogenating) a trimer acid which was a reaction product of oleic acid and linoleic acid, in an amount of 10 wt % within the range defined in the present invention; adipic acid with 6 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 28 containing a hydrogenated trimer acid obtained by adding hydrogen to (hydrogenating) a trimer acid which was a reaction product of oleic acid and linoleic acid, in an amount of 10 wt % within the range defined in the present invention; azelaic acid with 9 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 29 containing a hydrogenated trimer acid obtained by adding hydrogen to (hydrogenating) a trimer acid which was a reaction product of oleic acid and linoleic acid, in an amount of 10 wt % within the range defined in the present invention; no different organic acid; an epoxy resin as a thermosetting resin in an amount of 43 wt % within the range defined in the present invention; a phenolic curing agent as a curing agent in an amount of 30 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 30 containing a hydrogenated trimer acid obtained by adding hydrogen to (hydrogenating) a trimer acid which was a reaction product of oleic acid and linoleic acid, in an amount of 5 wt %, which was decreased within the range defined in the present invention; glutaric acid with 5 carbon atoms as a different organic acid in an amount of 8 wt %, which was increased within the range defined in the present invention; an epoxy resin as a thermosetting resin in an amount of 43 wt % within the range defined in the present invention; a phenolic curing agent as a curing agent in an amount of 27 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 31 containing a hydrogenated trimer acid obtained by adding hydrogen to (hydrogenating) a trimer acid which was a reaction product of oleic acid and linoleic acid, in an amount of 15 wt %, which was increased within the range defined in the present invention; no different organic acid; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 32 containing a hydrogenated trimer acid obtained by adding hydrogen to (hydrogenating) a trimer acid which was a reaction product of oleic acid and linoleic acid, in an amount of 20 wt %, which was increased within the range defined in the present invention; glutaric acid with 5 carbon atoms as a different organic acid in an amount of 6 wt %, which was increased within the range defined in the present invention; an epoxy resin as a thermosetting resin in an amount of 62 wt %, which was increased within the range defined in the present invention; no curing agent; diphenylguanidine as an amine in an amount of 10 wt %, which was increased within the range defined in the present invention; a bisamide thixotropic agent in an amount of 1 wt % and hydrogenated castor oil in an amount of 1 wt %, as thixotropic agents, the total amount of the thixotropic agents falling within the range defined in the present invention; and no solvent, also provided a sufficient effect on the solder wettability. Also, the effect of suppressing generation of voids in the epoxy resin was obtained.

Executed Example 33 containing 2.5 wt % of a dimer acid which was a reaction product of oleic acid and linoleic acid, 2.5 wt % of a trimer acid which was a reaction product of oleic acid and linoleic acid, 2.5 wt % of a hydrogenated dimer acid obtained by adding hydrogen to (hydrogenating) the dimer acid which was a reaction product of oleic acid and linoleic acid, and 2.5 wt % of a hydrogenated trimer acid obtained by adding hydrogen to (hydrogenating) the trimer acid which was a reaction product of oleic acid and linoleic acid, the total amount of the dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid falling within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent in an amount of 1 wt % and hydrogenated castor oil in an amount of 1 wt % as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 34 containing a dimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; a bisamide thixotropic agent as a thixotropic agent in an amount of 2 wt % within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 35 containing a dimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 25 wt % within the range defined in the present invention; diphenylguanidine as an amine in an amount of 5 wt % within the range defined in the present invention; hydrogenated castor oil as a thixotropic agent in an amount of 2 wt % within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 36 containing a dimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 20 wt % within the range defined in the present invention; diphenylguanidine as an amine in an amount of 5 wt % within the range defined in the present invention; hydrogenated castor oil as a thixotropic agent in an amount of 7 wt %, which was increased within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

Executed Example 37 containing a dimer acid, which was a reaction product of oleic acid and linoleic acid, in an amount of 10 wt % within the range defined in the present invention; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 17 wt % within the range defined in the present invention; diphenylguanidine as an amine in an amount of 5 wt % within the range defined in the present invention; a bisamide thixotropic agent in an amount of 5 wt % and hydrogenated castor oil in an amount of 5 wt %, as thixotropic agents, the total amount of the thixotropic agents falling within the range defined in the present invention; and dibutyl diglycol ether as a solvent in an amount of 10 wt % within the range defined in the present invention, also provided a sufficient effect on the solder wettability. Also, the effect of suppressing generation of voids in the epoxy resin was obtained.

In contrast, Comparison Example 1 containing none of a dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid; a long-chain dibasic acid mixture in an amount of 10 wt %; glutaric acid with 5 carbon atoms as a different organic acid in an amount of 5 wt % within the range defined in the present invention; an epoxy resin as a thermosetting resin in an amount of 43 wt % within the range defined in the present invention; a phenolic curing agent as a curing agent in an amount of 17 wt % within the range defined in the present invention; diphenylguanidine as an amine in an amount of 5 wt % within the range defined in the present invention; a bisamide thixotropic agent as a thixotropic agent in an amount of 2 wt % within the range defined in the present invention; and dibutyl diglycol ether as a solvent in an amount of 10 wt % within the range defined in the present invention, provided an effect of suppressing generation of voids in the epoxy resin, but provided no sufficient effect on the solder wettability.

The long-chain dibasic acid mixture is a mixture in which long-chain dibasic acids having the compositions shown in the following (1), (2), (3) and (4) are mixed:
(1) 2-methylnonanedioic acid;
(2) 4-(methoxycarbonyl)-2,4-dimethylundecanedioic acid;
(3) 4,6-bis(methoxycarbonyl)-2,4,6-trimethyltridecanedioic acid; and
(4) 8,9-bis(methoxycarbonyl)-8,9-dimethylhexadecanedioic acid.

The ratio of the long-chain dibasic acids shown in (1), (2), (3) and (4) is as follows when the ratio of the entire long-chain dibasic acid mixture is 100 wt %.
(1) 30 to 60 wt %
(2) 8 to 20 wt %
(3) 8 to 20 wt %
(4) 15 to 30 wt %

Here, the long-chain dibasic acid mixture can be obtained by a method including the step of reacting an alkyl-substituted cycloalkanone and an alkyl methacrylate to synthesize a long-chain dibasic acid ester, and the step of hydrolyzing the long-chain dibasic acid ester obtained in the above-described step.

Also, Comparison Example 2 containing none of a dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid; glutaric acid with 5 carbon atoms as a different organic acid in an amount of 15 wt % beyond the range defined in the present invention; an epoxy resin as a thermosetting resin in an amount of 43 wt % within the range defined in the present invention; a phenolic curing agent as a curing agent in an amount of 17 wt % within the range defined in the present invention; diphenylguanidine as an amine in an amount of 5 wt % within the range defined in the present invention; a bisamide thixotropic agent as a thixotropic agent in an amount of 2 wt % within the range defined in the present invention; and dibutyl diglycol ether as a solvent in an amount of 10 wt % within the range defined in the present invention, provided an effect on the solder wettability, but provided no effect of suppressing generation of voids in the epoxy resin.

Further, Comparison Example 3 containing none of a dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid; a long-chain dibasic acid mixture in an amount of 20 wt %; glutaric acid with 5 carbon atoms as a different organic acid in an amount of 6 wt % within the range defined in the present invention; an epoxy resin as a thermosetting resin in an amount of 62 wt % within the range defined in the present invention; no curing agent; diphenylguanidine as an amine in an amount of 5 wt % within the range defined in the present invention; a bisamide thixotropic agent as a thixotropic agent in an amount of 2 wt % within the range defined in the present invention; and no solvent, provided an effect of suppressing generation of voids in the epoxy resin, but provided no sufficient effect on the solder wettability.

From the above, the flux containing: 5 wt % or more and 20 wt % or less of any one of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid, or, in total, of two or more of a dimer acid, a trimer acid, a hydrogenated dimer acid obtained by adding hydrogen to (hydrogenating) the dimer acid, and a hydrogenated trimer acid obtained by adding hydrogen to (hydrogenating) the trimer acid; 30 wt % or more and 70 wt % or less of a thermosetting resin; and 3 wt % or more and 15 wt % or less of an amine, the flux containing: 5 wt % or more and 20 wt % or less of any one of a dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid, or, in total, of two or more of a dimer acid which was a reaction product of oleic acid and linoleic acid, a trimer acid which was a reaction product of oleic acid and linoleic acid, a hydrogenated dimer acid obtained by adding hydrogen to (hydrogenating) the dimer acid which was a reaction product of oleic acid and linoleic acid, and a hydrogenated trimer acid obtained by adding hydrogen to (hydrogenating) the trimer acid which was a reaction product of oleic acid and linoleic acid; 30 wt % or more and 70 wt % or less of a thermosetting resin; and 3 wt % or more and 15 wt % or less of an amine, and the solder pastes using these fluxes provided an effect of providing good solder wetting. Also, the effect of suppressing generation of voids in the epoxy resin was obtained.

These effects were not inhibited even in the cases of incorporating a different organic acid, a phenolic curing agent, a thixotropic agent, and a solvent as activators in the amounts within the ranges defined in the present invention.

The invention claimed is:

1. A flux, comprising:
    5 wt % or more and 20 wt % or less of any one of a dimer acid which is a reaction product of oleic acid and linoleic acid, a trimer acid which is a reaction product of oleic acid and linoleic acid, a hydrogenated dimer acid obtained by hydrogenating the dimer acid which is a reaction product of oleic acid and linoleic acid, and a hydrogenated trimer acid obtained by hydrogenating the trimer acid which is a reaction product of oleic acid and linoleic acid, or, in total, of two or more of the dimer acid which is a reaction product of oleic acid and linoleic acid, the trimer acid which is a reaction product of oleic acid and linoleic acid, the hydrogenated dimer acid obtained by hydrogenating the dimer acid which is a reaction product of oleic acid and linoleic acid, and the hydrogenated trimer acid obtained by hydrogenating the trimer acid which is a reaction product of oleic acid and linoleic acid;
    30 wt % or more and 70 wt % or less of a thermosetting resin; and
    3 wt % or more and 15 wt % or less of an amine,
    wherein for evaluation of solder wettability,
        a first sample is prepared by printing the flux with a thickness of 0.1 mm on a Cu-OSP electrode and placing a solder ball having a 0.3 mm diameter thereon and then heating from 25° C. to 250° C. in an $N_2$ atmosphere at a first temperature rising rate of 1° C./sec using a first reflow furnace, and
        the first sample is visually checked and the solder is wet,
        wherein the solder ball of the first sample comprises a composition of 3.0 wt % of Ag, 0.5 wt % of Cu, and a balance of Sn,
    wherein for evaluation of a void,
        a second sample is prepared by applying the flux onto a glass plate and placing a ball grid array thereon and then heating from 25° C. to 250° C. in an $N_2$ atmosphere at a second temperature rising rate of 1° C./sec using a second reflow furnace, and
        the second sample is observed from the back side of the glass plate and the void occurrence rate is 50% or less,
        wherein the ball grid array of the second sample comprises a size of 10 mm on one side and 192 solder bumps, wherein each solder bump comprises a pitch of 0.5 mm; a diameter of 0.3 mm; and a composition of 3.0 wt % of Ag, 0.5 wt % of Cu, and a balance of Sn.

2. The flux according to claim 1, wherein the thermosetting resin is an epoxy resin.

3. A flux, comprising:
    5 wt % or more and 20 wt % or less of any one of a dimer acid, a trimer acid, a hydrogenated dimer acid obtained by hydrogenating the dimer acid, and a hydrogenated trimer acid obtained by hydrogenating the trimer acid, or, in total, of two or more of a dimer acid, a trimer acid, a hydrogenated dimer acid obtained by hydrogenating the dimer acid, and a hydrogenated trimer acid obtained by hydrogenating the trimer acid;
    30 wt % or more and 70 wt % or less of a thermosetting resin;
    3 wt % or more and 15 wt % or less of an amine;
    more than 0 wt % and 10 wt % or less of an organic acid with 12 or less carbon atoms;
    more than 0 wt % and 40 wt % or less of a phenolic curing agent;
    more than 0 wt % and 15 wt % or less of a solvent; and
    more than 0 wt % and 10 wt % or less of a thixotropic agent,
    wherein for evaluation of solder wettability,
        a first sample is prepared by printing the flux with a thickness of 0.1 mm on a Cu-OSP electrode and placing a solder ball having a 0.3 mm diameter thereon and then heating from 25° C. to 250° C. in an $N_2$ atmosphere at a first temperature rising rate of 1° C./sec using a first reflow furnace, and
        the first sample is visually checked and the solder is wet, wherein the solder ball of the first sample comprises a composition of 3.0 wt % of Ag, 0.5 wt % of Cu, and a balance of Sn, wherein for evaluation of a void,
a second sample is prepared by applying the flux onto a glass plate and placing a ball grid array thereon and then heating from 25° C. to 250° C. in an $N_2$ atmosphere at a second temperature rising rate of 1° C./sec using a second reflow furnace, and the second sample is observed from the back side of the glass plate and the void occurrence rate is 50% or less, wherein the ball grid array of the second sample comprises a size of 10 mm on one side and 192 solder bumps, wherein each solder bump comprises a pitch of 0.5 mm; a diameter of 0.3 mm; and a composition of 3.0 wt % of Ag, 0.5 wt % of Cu, and a balance of Sn.

4. The flux according to claim 1, further comprising:
more than 0 wt % and 10 wt % or less of an organic acid with 12 or less carbon atoms;
more than 0 wt % and 40 wt % or less of a phenolic curing agent;
more than 0 wt % and 15 wt % or less of a solvent; and
more than 0 wt % and 10 wt % or less of a thixotropic agent.

5. The flux according to claim 2, further comprising:
more than 0 wt % and 10 wt % or less of an organic acid with 12 or less carbon atoms;
more than 0 wt % and 40 wt % or less of a phenolic curing agent;
more than 0 wt % and 15 wt % or less of a solvent; and
more than 0 wt % and 10 wt % or less of a thixotropic agent.

6. The flux according to claim 1, further comprising a silane coupling agent.

7. The flux according to claim 2, further comprising a silane coupling agent.

8. The flux according to claim 3, further comprising a silane coupling agent.

9. A solder paste, comprising:
solder powder; and
a flux, the flux comprising:
5 wt % or more and 20 wt % or less of any one of a dimer acid which is a reaction product of oleic acid and linoleic acid, a trimer acid which is a reaction product of oleic acid and linoleic acid, a hydrogenated dimer acid obtained by hydrogenating the dimer acid which is a reaction product of oleic acid and linoleic acid, and a hydrogenated trimer acid obtained by hydrogenating the trimer acid which is a reaction product of oleic acid and linoleic acid, or, in total, of two or more of the dimer acid which is a reaction product of oleic acid and linoleic acid, the trimer acid which is a reaction product of oleic acid and linoleic acid, the hydrogenated dimer acid obtained by hydrogenating the dimer acid which is a reaction product of oleic acid and linoleic acid, and the hydrogenated trimer acid obtained by hydrogenating the trimer acid which is a reaction product of oleic acid and linoleic acid;

30 wt % or more and 70 wt % or less of a thermosetting resin; and 3 wt % or more and 15 wt % or less of an amine, wherein for evaluation of solder wettability,
a first sample is prepared by printing the flux with a thickness of 0.1 mm on a Cu-OSP electrode and placing a solder ball having a 0.3 mm diameter thereon and then heating from 25° C. to 250° C. in an $N_2$ atmosphere at a first temperature rising rate of 1° C./sec using a first reflow furnace, and the first sample is visually checked and the solder is wet, wherein the solder ball of the first sample comprises a composition of 3.0 wt % of Ag, 0.5 wt % of Cu, and a balance of Sn, wherein for evaluation of a void,
a second sample is prepared by applying the flux onto a glass plate and placing a ball grid array thereon and then heating from 25° C. to 250° C. in an $N_2$ atmosphere at a second temperature rising rate of 1° C./sec using a second reflow furnace, and the second sample is observed from the back side of the glass plate and the void occurrence rate is 50% or less, wherein the ball grid array of the second sample comprises a size of 10 mm on one side and 192 solder bumps, wherein each solder bump comprises a pitch of 0.5 mm; a diameter of 0.3 mm; and a composition of 3.0 wt % of Ag, 0.5 wt % of Cu, and a balance of Sn.

10. The solder paste according to claim 9, wherein the thermosetting resin is an epoxy resin.

11. The solder paste according to claim 9, wherein the flux further comprises:
more than 0 wt % and 10 wt % or less of an organic acid with 12 or less carbon atoms;
more than 0 wt % and 40 wt % or less of a phenolic curing agent;
more than 0 wt % and 15 wt % or less of a solvent; and
more than 0 wt % and 10 wt % or less of a thixotropic agent.

12. The solder paste according to claim 9, wherein the flux further comprises a silane coupling agent.

13. The flux according to claim 3, wherein the thermosetting resin is an epoxy resin.

14. The solder paste according to claim 10, wherein the flux further comprises a silane coupling agent.

15. The solder paste according to claim 11, wherein the thermosetting resin is an epoxy resin.

16. The solder paste according to claim 11, wherein the flux further comprises a silane coupling agent.

* * * * *